United States Patent Office 3,446,840
Patented May 27, 1969

3,446,840
PROCESS FOR THE CATALYTIC OXIDATION OF PROPYLENE
Tsuneyuki Kato, Yokohama, Atsushi Aoshima, Kawasaki-shi, Yasuhiro Kubota, Yokohama, and Kenji Matsumura, Kawasaki-shi, Japan, assignors to Asahi Kasei Kogyo Kabushiki Kaisha, Osaka, Japan, a corporation of Japan
No Drawing. Filed Feb. 24, 1966, Ser. No. 529,628
Int. Cl. C07c 57/04, 51/20; B01j 11/82
U.S. Cl. 260—533   10 Claims

ABSTRACT OF THE DISCLOSURE

A process for the catalytic oxidation of propylene which comprises contacting propylene at an elevated temperature and in the gas phase with oxygen or an oxygen-containing gas to produce acrolein and/or acrylic acid by using a novel catalyst having the following formula;

$$Bi_aFe_bP_cB_dMo_eO_f$$

wherein $a$, $b$, $c$, $d$, $e$, and $f$ are the atomic ratios of the respective elements constituting the catalyst and $a$ is 0.1 to 12, $b$ is 0.1 to 12, $c$ is 0.1 to 2, $d$ is 0.1 to 4, $e$ is 12 and $f$ is 35 to 83.

---

This invention relates to a process for the catalytic oxidation of propylene with oxygen or an oxygen-containing gas at an elevated temperature and in the gas phase to produce acrolein and acrylic acid. More particularly, the invention pertains to the commercially advantageous production of acrolein and acrylic acid from propylene, using a novel catalyst containing bismuth oxide and molybdenum oxide which is suitable for the catalytic oxidation of propylene.

Recently, acrolein and acrylic acid have become important intermediates for the preparation of, for example, acrylic acid, acrylic acid ester derivatives, allyl alcohol and the like, and therefore attention has been paid to processes for the economical production of acrolein and acrylic acid.

There have lately been proposed a variety of processes for producing acrolein and acrylic acid from inexpensive propylene.

For example, British Patent No. 655,210 describes in detail a process for preparing acrolein over a copper catalyst. According to this process, however, the concentration of feed propylene is low, and the feed gas is uneconomically required to be mixed with expensive selenium.

United States Patent No. 2,941,007 discloses a process for producing unsaturated aldehydes and ketones, particularly acrolein, from olefins. The catalyst employed in this process contains oxides of bismuth, phosphorus and molybdenum and is supported on a silica carrier. However, the maximum reaction results attained according to this process are 57% propylene conversion and 72% acrolein yield based on converted propylene, and are not so favorable.

West German Patent No. 1,125,901 and Belgian Patent No. 611,961 describe a process for preparing unsaturated aldehydes or ketones and unsaturated acids, particularly acrolein and acrylic acid, from suitable olefins using a catalyst containing oxides of bismuth, iron, phosphorus and molybdenum and supported on a silica carrier. In the above process, the catalyst used is one prepared by adding an iron compound to the catalyst components employed in said United States Patent No. 2,941,007 and the optimum reaction temperature is lowered and the catalyst activity is enhanced by addition of said iron compound. The reaction results according to this process, in the case of one pass, are 70% propylene conversion, 84% acrolein yield based on the converted propylene and several percent acrylic acid yield based on the converted propylene. Further, it has been reported that the results attained in the production of acrylic acid by cyclically reacting the produced acrolein are 58.7% acrylic acid yield based on the converted propylene and 13% acetic acid yield.

As a result of further studies on the catalyst employed in said West German patent and Belgian patent, the present inventors found the fact that in case a catalyst prepared by adding a boron oxide to said catalyst is used, the by-production of acetic acid, acetaldehyde and so on is inhibited to improve the yields of acrolein and acrylic acid based on the converted proylene and, surprisingly, there is attained such effect that the catalyst activity is enhanced to a great extent and is maintained stably. Based on the above finding, the present inventors have been successful in establishing the present invention.

It is therefore an object of the present invention to provide a process for producing acrolein and/or acrylic acid by contacting propylene with oxygen or an oxygen-containing gas at an elevated temperature and in the gas phase, characterized by using as a catalyst a compound of the empirical formula $$Bi_aFe_bP_cB_dMo_eO_f$$

wherein $a$, $b$, $c$, $d$, $e$ and $f$ are the atomic ratios of the respective elements constituting the compound, and further, where $a$ is 0.1–12, $b$ is 0.1–12, $c$ is 0.1–2, $d$ is 0.1–4, $e$ is 12, and $f$ is 35–83.

The actual state of the bonding of respective elements constituting the catalyst of the present invention is not clear. It is, however, considered that they might probably be present in the form of oxides or some of them form heteropoly acids. The catalyst of the present invention may vary in oxygen content depending upon the oxidized state of the respective elements and, in some cases, may contain a more or less amount of water.

In practicing the present invention, the above-mentioned catalyst components are used either as such or supported on a carrier. As the carrier, one for conventional oxidation catalyst such as, for example, silica, alumina, diatomaceous earth and the like, is employed. The catalyst supported on the carrier is used either as such or after being formed as is well known to the skilled in the art. The amount of the carrier used is ordinarily 20–70% by weight.

As is well known, boron easily forms together with phosphorus a heteropoly acid of molybdenum. Therefore, the catalyst employed in the present invention is prepared, for example, in the following manners:

Nitric acid-acidified aqueous solutions of molybdenum oxide, phosphoric acid and boric acid are heated, and aqueous solutions of bismuth salt and iron salt are added thereto. The resulting mixture is added dropwise to a carrier substance, preferably a silica sol, and the volatile substance is evaporated and concentrated, is dried at 80°–150° C., and is then heated at 300°–600° C. for 3–20 hours. In place of the vaporization concentration operation, a spray-drying process may be advantageously adopted. As the supply source of molybdenum, there is used, for example, molybdenum oxide (MoO₃), ammonium molybdate or molybdic acid. The bismuth salt employed is, for example, bismuth nitrate, and the iron salt employed is, for example, ferric nitrate. However, the processes for preparing the catalyst employed in the present invention are not limited to those described above.

The present process for the catalytic oxidation of propylene may be practiced according to any types of fixed bed reaction and fluidized bed reaction.

The reaction temperature adopted in the present invention is 250° to 550° C., preferably 340° to 450° C., and favorable results are obtainable at relatively low temperatures. In the process of the present invention, the reaction pressure is not particularly important, and completely satisfactory results are attained at or near atmospheric pressure. The apparent contact time of the feed gas varies depending on the type of reaction, but may be 0.2–4 seconds in the case of fixed bed reaction. However, this condition is not critical. The apparent contact time is defined here below:

$$\text{Apparent contact time} = \frac{\text{Apparent volume of the catalyst in the reactor}}{\text{Volume of material fed to the reactor per unit time}}$$

The volume of material fed to the reactor is measured under the conditions of the reaction and the contact time is described in terms of seconds. In accordance with the present invention, the amount of oxygen in the feed may be about 0.2–4.2 mols, preferably 0.7–2 mols, per mol of propylene. The oxygen may be used in any form of an oxygen-containing gas or free molecular oxygen, but it is desirable to use air as a supply source in view of cost and the effect of $N_2$ in air as a diluent. Further, the amount of water added to the reaction mixture gas may be about 0–10 mols, preferably 3–6 mols, per mol of propylene. The water may be in the vapor phase during the reaction. Water is added as a diluent and is not always required but may be replaced with $N_2$ argon, $Co_2$, propane, or the like or a mixture thereof. However, it appears that the addition of water gives advantageous effect to the reaction. The addition of a diluent is not a required condition.

According to the present invention, acrolein and acrylic acid can be obtained in high yields by catalytically oxidizing propylene with oxygen or oxygen-containing gas at an elevated temperature and in the gas phase, as mentioned above. In the case the catalyst composition and reaction conditions are suitably selected, in accordance with the present invention, the conversion of propylene can be elevated without lowering the yields of acrolein and acrylic acid, and therefore no unreacted propylene is required to be recycled. Further, the produced acrolein is recycled and reacted together with unreacted propylene under suitable catalyst composition and reaction conditions, whereby acrylic acid may be obtained in a considerably high yield. The catalyst employed in the present invention undergoes not marked influence of the reaction and can stably maintain the initial activity even after long time reaction.

The following examples illustrate the present invention in detail, but it should be construed that the invention is not limited thereto.

In the examples the following definitions are employed:

Pescent conversion =

$$\frac{\text{Weight of propylene in feed} - \text{Weight of propylene in effluent}}{\text{Weight of propylene in feed}} \times 100$$

Percent yield =

$$\frac{\text{Weight of propylene converted to acrolein or others}}{\text{Weight of propylene in feed} - \text{Weight of propylene in effluent}} \times 100$$

Example 1

To 5 ml. of an aqueous solution containing 0.145 g. of boric anhydride ($B_2O_3$) was added a mixed solution of 0.48 g. of 85% phosphoric acid and 17.96 g. of molybdic acid ($H_2MoO_4 \cdot H_2O$) in 20 ml. of water and 10 ml. of 10% nitric acid. The resulting solution was heated and refluxed for 16 hours to form a complex. To this were added 3 ml. of a solution of 8.06 g. of bismuth nitrate [$Bi(NO_3)_3 \cdot 5H_2O$] in 5% nitric acid, and 8 ml. of an aqueous solution of 23.5 g. of iron nitrate

[$Fe(NO_3)_3 \cdot 9H_2O$]

The resulting mixture was added dropwise to 89.5 g. of a 20% silica sol, with stirring. The mixture was evaporated and the resulting residue was dried at 120° C. for 10 hours, formed into granules of 2–3 mm. in diameter and was heated at 460° C. for 10 hours to obtain a catalyst. The composition of the catalyst was $$Bi_2Fe_7P_{0.5}B_{0.5}Mo_{12}O_{41-65}$$

20 g. of the above catalyst was placed in a stainless reactor having an inner diameter of 15 mm. Into the reactor, a mixed gas comprising propylene, air and water at a molar ratio of 1:7.2:4 was introduced and was reacted at a reaction temperature of 370° C. The contact time was 0.8 seconds, whereby 59.4% of the propylene was reacted. The effluent was scrubbed with water and was determined by gas chromatography and chemical analysis to obtain, based on the reacted propylene, 18.2% of acrylic acid, 65.8% of acrolein, 1.1% of acetic acid and 0.8% of acetaldehyde.

Using the same catalyst as in the above, a mixed gas of the same composition was reacted at a reaction temperature of 400° C. The apparent contact time was 1.3 seconds, and the effluent was condensed to obtain an aqueous solution of acrylic acid and acetic acid. The amount of acrolein in said liquid phase was small. A minor portion of propylene and acrolein in the gas phase was discharged out of the system but a major portion thereof was recycled and introduced in the reactor to continue the reaction. The yield of acrylic acid based on the propylene converted was 58.1%.

Example 2

To 10 ml. of an aqueous solution of 0.290 g. of boric anhydride was added a solution of 0.48 g. of 85% phosphoric acid and 17.75 g. of ammonium molybdate [$(NH_4)_6Mo_7O_{24} \cdot 4H_2O$] in 20 ml. of water and 5 ml. of nitric acid, and the resultant was heated and refluxed for 15 hours. To this were added 4 ml. of a solution of 4.03 g. of bismuth nitrate in 5% nitric acid and 5 ml. of an aqueous solution of 10.9 g. of ferric nitrate. The mixed solution was added dropwise to 71 g. of a 20% silico sol, and the mixture was evaporated, was then dried and was heated at 460° C. for 6 hours to obtain a catalyst having the composition $Bi_1Fe_3P_{0.5}B_1Mo_{12}O_{39-56}$.

The catalyst was pulverized to granules of 1–2.5 mm. in diameter, and 20 g. of the granules were placed in the same reactor as in Example 1. Into the reactor, a mixed gas comprising propylene, air and water at a molar ratio of 1:7.2:5 was introduced at 400° C. and at atmospheric pressure. The apparent contact time was about one second. The conversion of propylene was 63.1%, and the yields based on the converted propylene were 15.8% acrylic acid, 51.0% acrolein, 1.2% acetic acid, and 1.1% acetaldehyde. The reaction was conducted continuously for about 100 hours, but little variation in catalyst activity was observed.

Example 3

A solution of 10.6 parts by weight of ammonium molybdate [$(NH_4)_6Mo_7O_{24} \cdot 4H_2O$] in 34.2 parts by volume of water was added to 34 parts by weight of a 20% silica sol. To the solution was added a solution of 0.24 part by weight of phosphoric acid ($H_3PO_4$) and 0.60 part by weight of boric acid ($H_3BO_3$) in 5.4 parts by volume of water. To the resulting solution, a solution of 9.1 parts by weight of ferric nitrate [$Fe(NO_3)_3 \cdot 9H_2O$] in 45 parts by volume of water was added with stirring, and further 44.9 parts by volume of a solution of 10.9 parts by weight of bismuth nitrate [$Bi(NO_3)_3 \cdot 5H_2O$] in 10% $HNO_3$ was added, and the mixture was thoroughly stirred and admixed. The resulting suspension was evaporated to dryness under reduced pressure and the residue obtained was dried overnight at 110° C. in an air bath.

The dried mass was decomposed at below 300° C. in air and was heated at 450° C. for 3 hours to obtain a catalyst. The thus obtained catalyst had the composition $$Bi_{4.5}Fe_{4.5}P_{0.5}B_2Mo_{12}O_{52-56}$$

and contained 30% by weight of $SiO_2$.

This catalyst was granulated and was placed in a reactor. Into the reactor, a mixed gas comprising propylene, air and steam at a molar ratio of 8:60:32 was introduced and was reacted at a temperature of 400° C. The apparent contact time was 0.6 second, whereby 95% of the fed propylene was reacted. Yields based on the reacted propylene were 81% acrolein, 5.5% acrylic acid and 0.5% acetic acid, and acetaldehyde was formed in about a trace amount. The remainder was $CO_2$ and CO.

The reaction was conducted for about 1,000 hours under the above conditions, but the lowering of catalyst activity was scarcely observed.

Example 4

A catalyst of the composition $Fe_{4.5}Bi_{4.5}P_1B_3Mo_{12}O_{56-59}$ which contained 30% by weight of $SiO_2$ was prepared in the same way as in Example 3.

This catalyst was placed in a stainless reactor. Into the reactor, a mixed gas comprising propylene, air and steam at a molar ratio of 10:50:40 was introduced at a reaction temperature of 400° C. The apparent contact time was 0.5 second, whereby 84% of the fed propylene was reacted. The yield of acrolein based on the reacted propylene was 88%. In addition thereto, acrylic acid, acetic acid and a trace amount of acetaldehyde were produced. The yields of acrylic acid and acetic acid based on the reacted propylene were 2.5% and 0.5%, respectively, and the remainder was $CO_2$ and CO.

Example 5

Several catalysts of the same composition as in Example 1, except that only the amount of boron was varied from 0 up to 2, were prepared and used in reactions under conditions of a reaction temperature of 370° C., an apparent contact time of 1 second, and a feed gas composition of propylene, air and steam at a molar ratio of 8.2:59.0:32.8, to obtain the following results:

| Experiment No. | 1 | 2 | 3 |
|---|---|---|---|
| Boron content (atomic ratio) | 0 | 0.5 | 2 |
| Propylene conversion (percent) | 60 | 67 | 65 |
| Yields (percent): | | | |
| Acrolein | 52 | 63 | 61 |
| Acrylic acid | 11 | 21 | 24 |
| Acetic acid | 5 | 1 | 1 |
| $CO_2$, CO | 32 | 15 | 14 |

Example 6

Several catalysts of the same composition as in Example 2, except that only the amount of boron was varied from 0 up to 2, were prepared and used in reactions under conditions of a reaction temperature of 400° C., an apparent contact time of one second, and a feed gas composition of propylene, air and steam at a molar ratio of 7.6:54.5:37.9 to obtain the following results:

| Experiment No. | 1 | 2 | 3 |
|---|---|---|---|
| Boron content (atomic ratio) | 0 | 1 | 2 |
| Propylene conversion (percent) | 60 | 63 | 60 |
| Yields (percent): | | | |
| Acrolein | 46 | 51 | 44 |
| Acrylic acid | 6 | 16 | 19 |
| Acetic acid | 1 | 1 | 1 |
| Acetaldehyde | 1 | 1 | 1 |
| $CO_2$, CO | 46 | 31 | 30 |

Example 7

Several catalysts of the same composition as in Example 4 which contained 39% by weight of $SiO_2$, except that only the amount of boron was varied from 0 up to 6, were prepared in the same way as in Example 3 and were used in reactions under conditions of a reaction temperature of 400° C., an apparent contact time of 0.7 second, and a feed gas composition of propylene, air and steam at a molar ratio of 8:60:32, to obtain the following results:

| Experiment No. | 1 | 2 | 3 | 4 |
|---|---|---|---|---|
| Boron content (atomic ratio) | 0 | 1 | 3 | 6 |
| Propylene conversion (percent) | 68 | 94 | 89 | 60 |
| Yields (percent): | | | | |
| Acrolein | 66 | 79 | 84 | 69 |
| Acrylic acid | 4 | 6 | 3 | 5 |
| Acetic acid | 1 | 1 | 0.5 | 1 |
| $CO_2$, CO | 29 | 14 | 12.5 | 25 |

What we claim is:

1. A process for the catalytic conversion of propylene to acrolein and acrylic acid which comprises contacting propylene in the vapor phase with a gas selected from the group consisting of oxygen and an oxygen containing gas, and wherein said propylene is mixed with from 0 to 10 moles of water per mole of propylene, at an elevated temperature in the presence of a catalyst of the formula:

$$Bi_aFe_bP_cB_dMo_eO_f$$

wherein $a$ is 0.1 to 12, $b$ is 0.1 to 12, $c$ is 0.1 to 2, $d$ is 0.1 to 4, $e$ is 12 and $f$ is 35–83.

2. A process according to claim 1 wherein $a$ is 1 to 9, and $b$ is 2 to 7.

3. A process according to claim 1 wherein the oxygen is present in a ratio of from 0.2 to 4.2 moles per mole of propylene, and the temperature is between 250° C. and 550° C.

4. A process according to claim 1 wherein the oxygen is present in a ratio of from 0.7 to 2 moles per mole of propylene, and the temperature is between 250° C. and 550° C.

5. A process according to claim 1 wherein the catalyst comprises a mixture of oxides of bismuth, iron, molybdenum, boron and phosphorus.

6. A process according to claim 1 wherein the catalyst is supported on a bed of a carrier, said carrier being selected from the group consisting of silica, alumina, and diatomaceous earth.

7. A process according to claim 1 wherein the catalyst is formed into granules.

8. A process according to claim 1 wherein the gas is air.

9. A process according to claim 1 wherein the catalyst is a fixed bed catalyst.

10. A process according to claim 1 wherein the catalyst is a fluidized bed catalyst.

References Cited

UNITED STATES PATENTS

| | | | |
|---|---|---|---|
| 3,171,859 | 3/1965 | Sennewald et al. | 260—604 |
| 3,029,288 | 4/1962 | Etherington | 260—604 |
| 3,065,264 | 11/1962 | Kock et al. | 260—533 |

FOREIGN PATENTS 948,687　2/1964　Great Britain.

JAMES A. PATTEN, *Primary Examiner.*

D. STENZEL, *Assistant Examiner.*

U.S. Cl. X.R.

252—432; 260—604